UNITED STATES PATENT OFFICE.

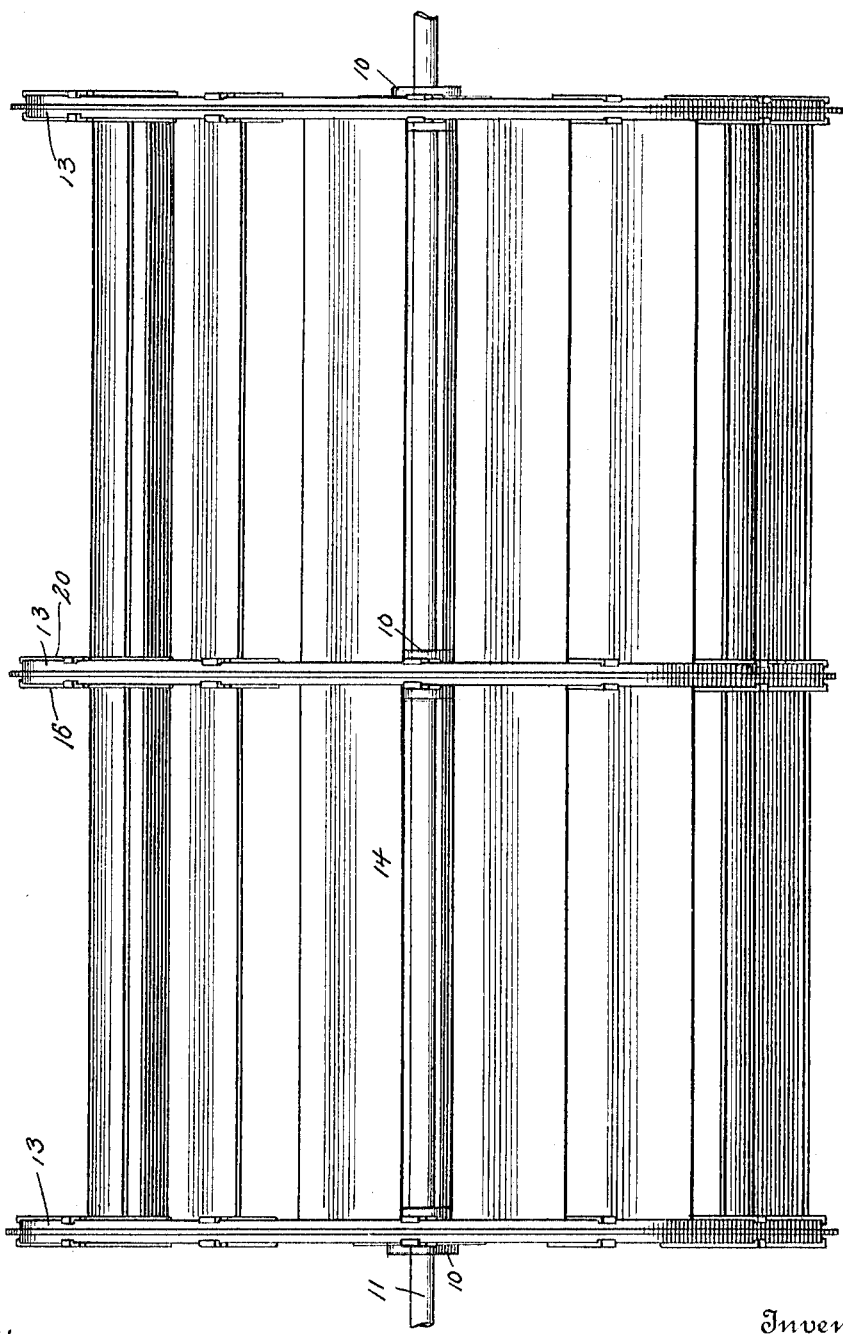

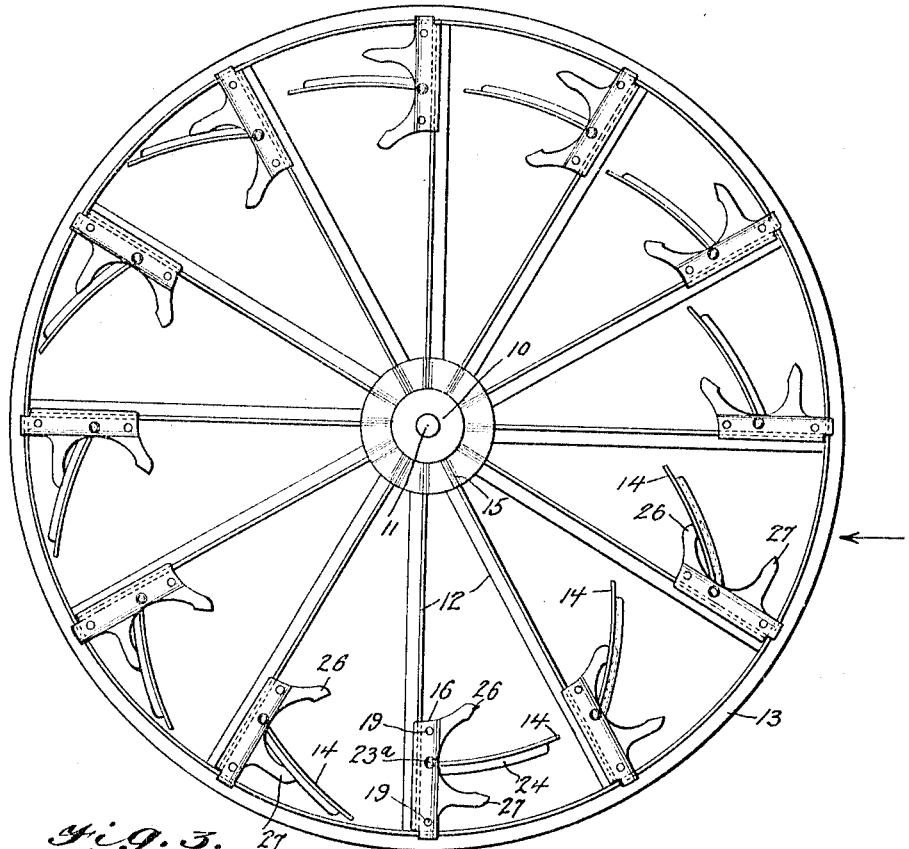

ORRIN W. WATSON, OF SPOKANE, WASHINGTON.

CURRENT-WHEEL.

1,120,109.  Specification of Letters Patent.  Patented Dec. 8, 1914.

Application filed November 8, 1913. Serial No. 799,933.

*To all whom it may concern:*

Be it known that I, ORRIN W. WATSON, a citizen of the United States, residing at Spokane, in the county of Spokane and State of Washington, have invented certain new and useful Improvements in Current-Wheels, of which the following is a specification.

This invention relates to that class of hydraulic motors known as current wheels, the wheel being submerged in a stream so as to be impelled by the current thereof.

The present invention is an improvement of the current wheel disclosed in Patent No. 1,083,472; dated January 6, 1914, and its object is to provide novel and improved supporting means for the impeller blades of the wheel, as will be hereinafter described in detail and claimed.

In order that the invention may be better understood, reference is had to the accompanying drawings, in which—

Figure 1 is a front elevation of the wheel; Fig. 2 is an end view thereof; Fig. 3 is a central longitudinal section of the blade-supporting means; Fig. 4 is a horizontal section on the line 4—4 of Fig. 3; Fig. 5 is a vertical section on the line 5—5 of Fig. 3, and Fig. 6 is a cross-section on the line 6—6 of Fig. 3.

In the drawings 10 denotes the hub of the wheel, the same being carried by a shaft or axle 11 from which the power is taken in any suitable or preferred manner. The wheel is adapted to be submerged in a stream and it is rotated by the current working against the blades thereof. The shaft is supported in a horizontal position, which places the wheel vertically in the stream. The shaft may also be positioned vertically to place the wheel horizontally. Any suitable bearings and supports for the shaft may be provided, and as these form no part of the present invention, they have not been illustrated.

From the hub 10 radiate spokes 12 which are connected at their outer ends to a rim 13. Three hubs and a corresponding number of sets of spokes are shown which are spaced from each other laterally. The spokes of the respective sets are in alinement, and each row of spokes carries a pivoted impeller blade 14 extending throughout the entire length of the wheel. The pivots of the blades are parallel to the axis of the wheel. The spokes 12 and the rims 13 are T-irons and the hubs 10 are castings having sockets 15 in which the inner ends of the spokes seat and are fastened. The blades are curved in the direction of their tip or outer ends.

The blades 14 are mounted and supported in the following manner: On the spokes 12 are secured supporting members 16 carrying hinge members 17 to which latter the blades are fastened. These blade-supporting and hinge members on the respective sets of spokes 12 are in alinement, and each blade is thus provided with three of such members, one at each end and one midway between the ends of the blade. Each supporting member 16 is mounted on the outside of the flanged end of the spoke 12, near the rim 13, and is shaped on one side to fit over the corresponding spoke flange, a groove 18 being provided in which the end of said flange seats. To the other side of the member is secured, by bolts 19, or otherwise, a plate 20 which has a part provided with a groove in which the other spoke flange seats. The parts 16 and 20 are tightly clamped to the spoke upon tightening up nuts 21 on the bolts 19. The outer ends of the parts 16 and 20 straddle the rim and are grooved, as indicated at 22, in which grooves the ends of the rim flanges seat, said flanges being on the inside of the rim. The intermediate portion of the part 16 has a socket to accommodate a knuckle 23 on the inner end of the hing member 17. A bolt 23ᵃ passing through this knuckle and the parts 16 and 20 forms the pivot on which the hinge member swings. On one side of the hinge member 17 is mounted a plate 24 which is channeled, the hinge member seating in the channel. To the outer face of the plate 24 is secured the blade 14. The plate 24 serves to reinforce the blade 14 and hold it in curved position. The bolts 25 which secure the blades pass through the plate 24 and the hinge member 17. From the member 16, on opposite sides of the hinge member 17, rise stop projections 26 and 27, respectively, between which said hinge member swings, the projections thus limiting the swing of the blade in either direction.

The structure hereinbefore described provides a firm and rigid mounting for the blade, and also secures the rim to the spokes. The connection is simple and has no parts subject to wear, except the pivot bolt 23ᵃ, which can be easily replaced. If the member 17 should wear, it can also be replaced at no great expense.

In practice, the wheel is set in the stream so that it is submerged, and the current working against the blades 14 causes the wheel to rotate in an obvious manner. Fig. 2 clearly shows the positions the blades assume during each cycle of operation. The arrow indicates the direction of the current. When the water strikes the convex side of the blades, that side is faced to the current and the blades are held in this position by the stops 26. As the blades reach the lower vertical center line of the wheel, and upon passing the same, they swing automatically until stopped by the projection 27, so that the current now strikes the opposite or concave face. The two stop projections 26 and 27 are arranged at different angles to the spokes, the projection 27 being nearer to a right angle than the projection 26. Thus, the blades, in the first described position, are not held as near at a right angle to the spokes that bear them, as in the second described position. This is desirable for the reason that in the first position they are nearer to the center of the wheel and therefore move more slowly through the water, and furthermore the flow of the water should not be checked until it comes in contact with the blades in the second position, where, owing to the curve of the blades, and their motion through the water, they will produce more power than in the first position. In the first position of the blades they extend at an acute angle to the spokes, or to a line projected radially from the pivots of the blades to the axis of the wheel, and in the second position they are at an obtuse angle. The blades are held in the first position as far to the front as possible. The blades produce power in both positions. It will be noted that the blade which is just approaching the lower vertical center line is cutting off all pressure from the blade which is at this line, in view of which the last-mentioned blade is allowed to swing quickly to the second position. The two blades to the right of the blade which is at the lower vertical center line, and the four blades to the left of said line are producing power, the blade which is approaching the upper vertical center line is just going off duty, and the other blades are idle. Thus, it will be seen that one-half of the blades are working all the time, and a maximum amount of power is produced.

I claim:

1. A current-wheel having pivoted blades, and stops between which the blades swing, the stops which are nearest to the axis of the wheel holding the blades at an acute angle to a line projected radially from the pivot of the blades to said axis, and the stops remote from the wheel axis holding the blades at an obtuse angle to said line.

2. A current-wheel having blades which are pivoted on axes extending parallel to the wheel axis, and stops on opposite sides of the pivot of each blade, between which stops the blade swings, the stops which are nearest to the axis of the wheel holding the blades at an acute angle to a line projected radially from the pivot of the blades to said axis, and the stops remote from the wheel axis holding the blades at an obtuse angle to said line.

3. A current-wheel comprising a hub, spokes, a rim at the outer end of the spokes, supporting members mounted on the spokes adjacent to the rim and having grooved extremities in which opposite sides of the rim seat, and pivoted blades carried by said members.

4. A current-wheel comprising a hub, spokes, blade-supporting members carried by the spokes and having sockets, hinge members carried by the supporting members and having knuckles which seat in the sockets thereof, pivots passing through the supporting members and the knuckles, blades carried by the hinge members, and stops on the supporting members on opposite sides of the pivots, between which stops the hinge members swing.

5. A current-wheel having pivoted blades, blade-supporting members, hinge members carried by the blade-supporting members, channeled bars straddling the hinge members, on which bars the blades fit, and fastening means passing through the hinge members, the channel bars and the blades.

In testimony whereof I affix my signature in presence of two witnesses.

ORRIN W. WATSON.

Witnesses:
   CHAS. A. HILLS,
   A. B. HOBLITT.